United States Patent
Zhodzishsky et al.

(10) Patent No.: US 7,439,908 B1
(45) Date of Patent: Oct. 21, 2008

(54) METHOD AND APPARATUS FOR DETERMINING SMOOTHED CODE COORDINATES OF A MOBILE ROVER

(75) Inventors: Mark I. Zhodzishsky, Moscow (RU); Victor A. Veitsel, Moscow (RU); Alexey Zinoviev, Moscow (RU)

(73) Assignee: Topcon GPS, LLC, Paramus, NJ (US)

( * ) Notice: Subject to any disclaimer, the term of this patent is extended or adjusted under 35 U.S.C. 154(b) by 220 days.

(21) Appl. No.: 11/429,109

(22) Filed: May 5, 2006

(51) Int. Cl.
    *H04B 7/185* (2006.01)
(52) U.S. Cl. .............. 342/357.12; 342/357.03; 342/357.08
(58) Field of Classification Search ..............
    342/357.01–357.17
    See application file for complete search history.

(56) References Cited

U.S. PATENT DOCUMENTS 6,191,732 B1   2/2001   Carlson et al.

2006/0017611 A1 *  1/2006  Hatch et al. ............ 342/357.03
2006/0071849 A1    4/2006  Howle et al.

* cited by examiner

*Primary Examiner*—Thomas H. Tarcza
*Assistant Examiner*—Nga X Nguyen
(74) *Attorney, Agent, or Firm*—Weinick & Associates, LLC

(57) ABSTRACT

Disclosed is a method for determining coordinates of a mobile rover. The method includes determining a vector of one-shot code coordinates of the mobile rover. The method also includes determining a vector of phase increments by determining full phase differences for each navigation satellite in a plurality of navigation satellites in view at a discrete time interval (called a time epoch) and at a previous time epoch in a plurality of time epochs. A vector of radial range increments is determined from the full phase differences. A vector of rover phase coordinate increments is also determined using the vector of radial range increments. The vector of one-shot code coordinates and the vector of rover phase coordinate increments are then filtered to determine, at each time epoch, smoothed code coordinates of the mobile rover. Measured phase increments are cleared up from abnormal measurements.

30 Claims, 4 Drawing Sheets

METHOD AND APPARATUS FOR DETERMINING SMOOTHED CODE COORDINATES OF A MOBILE ROVER

BACKGROUND OF THE INVENTION

The present invention relates generally to coordinate determination using satellite signals, and more particularly to coordinate determination using one-shot code coordinates and increments of carrier phase coordinates of satellite signals.

Satellite positioning systems, such as GPS (USA) and GLONASS (Russia), are well known in the art and are intended for highly accurate self-positioning of users possessing special navigation receivers. A navigation receiver receives and processes radio signals transmitted by satellites located within line-of-sight distance of the receivers. The satellite signals comprise carrier signals that are modulated by pseudo-random binary codes. The receiver measures the time delay of the received signal relative to a local reference clock or oscillator. These measurements enable the receiver to determine the so-called pseudo-ranges between the receiver and the satellites. The pseudo-ranges are different from the ranges (distances) between the receiver and the satellites due to various noise sources and variations in the time scales of the satellites and receiver. If the number of satellites is large enough, then the measured pseudo-ranges can be processed to determine the user location, i.e. code coordinates, and coordinate time scales. This type of system uses a single satellite receiver and is referred to herein as a stand alone system. These stand alone systems typically provide meter-level accuracy.

The requirement of determining user location with a high degree of precision, and the desire to improve the stability and reliability of measurements, have led to the development of differential navigation (DN). In differential navigation, the task of finding the user position, also called the Rover, is performed relative to a Base station (Base). The precise coordinates of the Base station are known and the Base station is generally stationary during measurements. The Base station has a navigation receiver which receives and processes the signals of the satellites to generate measurements. These signal measurements are transmitted to the Rover via a communication channel (e.g., wireless). The Rover uses these measurements received from the Base, along with its own measurements taken with its own navigation receiver, in order to precisely determine its location. The location determination is improved in the differential navigation mode because the Rover is able to use the Base station measurements in order to compensate for the major part of the strongly correlated errors in the Rover measurements. DN mode based on measuring pseudo-ranges only is called Differential Global Positioning Service (DGPS).

Various modes of operation are possible while using differential navigation. In post-processing (PP) mode, the Rover's coordinates are determined by co-processing the Base and Rover measurements after all measurements have been completed. This allows for highly accurate location determination because more data is available for the location determination. In real-time processing (RTP) mode, the Rover's coordinates are determined in real time upon receipt of the Base station information received via the communication channel.

The location determination accuracy of differential navigation may be further improved by supplementing the pseudo-range measurements with measurements of the phases of the satellite carrier signals. If the carrier phase of the signal received from a satellite in the Base receiver is measured and compared to the carrier phase of the same satellite measured in the Rover receiver, measurement accuracy may be obtained to within several percent of the carrier's wavelength. Real-time carrier signal based differential navigation is often referred to as real-time kinematic (RTK). The practical implementation of these advantages, which might otherwise be guaranteed by the measurement of the carrier phases, runs into the problem of ambiguity resolution for phase measurements.

The ambiguities are caused by two factors. First, the difference of distances from any satellite to the Base and Rover is usually much greater than the carrier's wavelength. Therefore, the difference in the phase delays of a carrier signal received by the Base and Rover receivers may substantially exceed one cycle. Second, it is not possible to measure the integer number of cycles from the incoming satellite signals; one can only measure the fractional part. Therefore, it is necessary to determine the integer number of cycles, which is called the "ambiguity". More precisely, the set of all such integer parts for all the satellites being tracked, one integer part for each satellite, needs to be determined. One has to determine this set along with other unknown values, which include the Rover's coordinates and the variations in the time scales.

At a high level, the task of generating highly-accurate navigation measurements is formulated as follows: it is necessary to determine the state vector of a system, with the vector containing $n_\Sigma$ unknown components. Those include three Rover coordinates (usually along Cartesian axes X, Y, Z) in a given coordinate system (sometimes time derivatives of coordinates are added too); the variations of the time scales which is caused by the phase drift of the local main reference oscillator in the receiver; and n integer unknown values associated with the ambiguities of the phase measurements of the carrier frequencies. The value of n is determined by the number of different carrier signals being processed, and accordingly coincides with the number of satellite channels actively functioning in the receiver. At least one satellite channel is used for each satellite whose broadcast signals are being received and processed by the receiver. Some satellites broadcast more than one code-modulated carrier signal, such as a GPS satellite which broadcasts a carrier in the L1 frequency band and a carrier in the L2 frequency band. If the receiver processes the carrier signals in both of the L1 and L2 bands (i.e., a dual-frequency receiver), the number of satellite channels (n) increases correspondingly. Dual-frequency receivers allow for ionosphere delay correction and make ambiguity resolution easier.

Two sets of navigation parameters are measured by the Base and Rover receivers, respectively, and are used to determine the unknown state vector. Each set of parameters includes the pseudo-range of each satellite to the receiver, and the full (complete) phase of each satellite carrier signal. Each pseudo-range is obtained by measuring the time delay of a code modulation signal of the corresponding satellite. The code modulation signal is tracked by a delay-lock loop (DLL) circuit in each satellite tracking channel. The full phase of a satellite's carrier signal is tracked by a phase-lock-loop (PLL) in the corresponding satellite tracking channel. An observation vector is generated as the collection of the measured navigation parameters for specific (definite) moments of time.

The relationship between the state vector and the observation vector is defined by a well-known system of navigation equations. Given an observation vector, the system of equations may be solved to find the state vector if the number of equations equals or exceeds the number of unknowns in the state vector. Conventional statistical methods are used to solve the system of equations: the least squares method, the method of dynamic Kalman filtering, and various modifications of these methods.

Practical implementations of these methods in digital form may vary widely. In implementing or developing such a method on a processor, one usually must find a compromise between the accuracy of the results and speed of obtaining results for a given amount of processor capability, while not exceeding a certain amount of loading on the processor.

One specific type of abnormal error is a phase lock loop (PLL) cycle slip. A PLL cycle slip is a cycle slip in the PLL circuits that are tracking the satellite carrier signal. After a cycle slip occurs, the PLL circuit transits to a new point of steady balance, after which it goes on with tracking the satellite carrier signal. As a result of a cycle slip, an abnormal error equal to several integer numbers of semi-cycles (half-cycles) is introduced into the full phase measurements. A cycle slip is characterized by two parameters: value and duration. The slip's value (in cycles) is determined by either 0.5K or K dependent on the PLL discriminator's type, where K is a random integer number. The duration of the cycle slip is also random. Minimal duration is defined by the PLL band while maximal duration depends upon the cause bringing about the cycle slip and can last up to several seconds. When the duration is long enough, tracking is lost.

Much of the advancements in satellite positioning has been directed to suppressing various types of errors. Differential navigation, for example, mitigates errors caused by the atmosphere, inaccurate knowledge of satellite trajectory, and the drift of a satellite's onboard clock. Other techniques have been developed to reduce the influence of abnormal errors, such as by analyzing indicators of anomalies. These techniques detect and eliminate incorrect and inaccurate measurements, such as when the parameters of received signals are degraded by heavy interference. There are also techniques of analyzing observation results which allow for redundancy of the satellite number to isolate a few unreliable measurements.

The U.S. government has stopped the intentional degradation of the GPS signals (also referred to as Selective Availability). As a result, a new generation of navigational receivers has been and continues to be designed and developed. A typical aim of these receivers is to determine relative rover motion with regard to its initial position (i.e., its local coordinates). The initial point (origin) of local coordinates originates from a marked point on the ground. Code coordinates or carrier phase increments can be used to measure rover position. Note that using carrier phase increments typically provides more accurate coordinates.

When considering the use of the above technologies, there is a trade-off between accuracy and cost. The most accurate technique is RTK, which can generally provide centimeter-level accuracy. However, this mode of operation requires a Rover and Base station both having a dual-frequency receiver, a radio for communicating corrections from the Base to the Rover via a communication link, and an algorithm for solving the ambiguities of the carrier phase measurements. Thus, while providing accurate positioning results, this mode of operation is also the most expensive, in terms of equipment costs, processing power, and complexity.

Alternatively, the least accurate technique is the stand alone system described above, which provides only meter-level accuracy. While less accurate, this type of system is also the least expensive and least complex, as it requires only a single satellite receiver and no base station.

RTK-receivers cannot traditionally operate in complex environments (for instance, in woods) when satellite signals are shaded and strong reflected signals have phases that change rapidly during rover movement. This results in large errors and a failure of RTK to resolve ambiguities and obtain fixed solutions. Further, using discrete code-modulated pseudo-range samples is also often inaccurate.

To improve the situation for single-frequency and/or standalone receivers, smoothing the measured pseudo-ranges with full carrier phases can be performed. Most pseudo-range errors are related to noise-induced fast fluctuations and multipath errors (when the rover is moving). Multipath errors also change quickly due to phase shifts. Pseudo-range fast fluctuations can be smoothed by a filter. However, this filter must not substantially increase dynamic errors. A Kalman filter, as well as a number of other filters with constant parameters, can be employed for smoothing. The results of heavy filtering depend on motion dynamics. For the Kalman filter, a priori data on dynamics parameters is to be specified in the motion model. Traditionally, the more complex the model is, the lower the accuracy achieved.

The measured carrier phase contains information about changes in the relative "satellite-observer" distance (i.e., the distance between a satellite and an observer), which also includes the rover's dynamics. As a result, combining code and phase measurements often considerably reduces the degree of uncertainty and enhances the efficiency of filtering.

Cycle slips often prevent the carrier phase from being continuously used. Continuous carrier phase refers to a known initial point from which phase increments are integrated in such a way that the stored number of full cycles (even if it is not observable at any given moment in time) is correctly considered. If a signal is weak or lost, the integration result is incorrect and highly affects the phase cycle integers, thereby degrading the results of filtering.

BRIEF SUMMARY OF THE INVENTION

In accordance with the present invention, a method for determining coordinates of a mobile rover includes determining a vector of one-shot code coordinates of the mobile rover. The method also includes determining a vector of phase increments by determining full phase differences for each navigation satellite in a plurality of navigation satellites in view at a discrete time interval (called a time epoch) and at a previous time epoch in a plurality of time epochs. A vector of radial range increments is determined from the full phase differences. A vector of rover phase coordinate increments is also determined using the vector of radial range increments. The vector of one-shot code coordinates and the vector of rover phase coordinate increments are then filtered to determine, at each time epoch, smoothed code coordinates of the mobile rover.

In one embodiment, the determining of the vector of one-shot code coordinates includes processing an N-dimensional vector of pseudoranges from the mobile rover to N navigation satellites at each time epoch in the plurality of time epochs. The vector of one-shot code coordinates is a two-dimensional or three-dimensional vector. The determining of a vector of radial range increments can include applying corrections for at least one of ionosphere and troposphere delay, Earth rotation, and predicted clock offset to the vector of radial range increments. These corrections are also referred to as the one-shot code coordinate vector.

The determining of a vector of radial range increments can include correcting the vector of radial range increments from an anomaly. This correcting can include correcting the vector of radial range increments from an unreliable time epoch and/or a channel with an anomaly. The corrected vector of radial range increments is processed to obtain a 2-3-dimensional vector of rover phase coordinate increments and a correction for clock offset. The processing can be performed using the least squares method (LSM).

In one embodiment, the filtering of the vector of one-shot code coordinates and the vector of rover phase coordinate increments includes calculating the vector of one-shot coordinates and its covariance matrix by processing a vector of pseudo-ranges at the time epoch. The filtering also includes calculating the vector of rover phase coordinate increments and its covariance matrix at the time epoch by processing a vector of full carrier phases at the previous time epoch and the current time epoch and calculating a vector of rover prolonged estimate of code coordinates and its covariance matrix at the time epoch by summing said vector of smoothed code coordinates at the previous time epoch and the corrected vector of rover phase coordinate increments from the previous time epoch to the current time epoch. The filtering also includes calculating a vector of the smoothed code coordinates and its covariance matrix at the time epoch by weighted summation of the vector of rover prolonged estimate of code coordinates and the vector of one-shot code coordinates.

In one embodiment, the determining of the vector of one-shot code coordinates and the determining of the vector of rover phase coordinate increments and their respective covariance matrix are determined by recursively executing the least squares method. The covariance matrix of the vector of rover phase coordinate increments is proportional to the covariance matrix of the vector of one-shot code coordinates. The weighted summation can use covariance matrices of addends without terms related to timescale offset as weighting multipliers. In one embodiment, the one-shot code coordinates from a geocentric coordinate system is transformed by a shift of a coordinate origin. The smoothed code coordinates of the rover can also be transformed into a geocentric coordinate system.

These and other advantages of the invention will be apparent to those of ordinary skill in the art by reference to the following detailed description and the accompanying drawings.

DETAILED DESCRIPTION

1. General Principle of Smoothing Code Coordinates

The present invention provides a method and apparatus of processing navigational measurements to measure coordinates of a mobile rover in a adverse environment. Receiver operation is assumed to be in an adverse environment (and/or with no corrections from the base station) when RTK is not used. Under such conditions, only code coordinates may be determined, and fast fluctuations are smoothed to improve accuracy. The present invention can also improve DGPS accuracy or enable the determining of RTK fixed solutions more quickly when more sophisticated equipment is used.

A standalone single-frequency receiver measures pseudo-ranges to the satellites in view (with the help of delay lock loop (DLL) tracking systems) and full carrier phases (with PLL circuits). The known method of smoothing code pseudo-ranges with carrier phase measurements in each satellite channel separately is often inefficient in an environment with heavy interference. The smoothing can often be stopped abruptly when a satellite is shaded by a local object, while a formerly shaded satellite is rising in the constellation. Frequent cycle slips when measuring full phases result in abnormal errors in smoothed pseudo-ranges and, hence, measured coordinates. Methods of combined smoothing for code and carrier phase measurements with a Kalman filter known to those skilled in the art allow a rover's trajectory to be well smoothed. Abnormal measurements, which have arisen during smoothing, may, however, cause bias errors. The present invention is based on the process of smoothing a rover's measured coordinates obtained using satellites in view. Shading and abnormal errors do not substantially affect output coordinates if the number of remaining satellites is still large enough.

Figure 1A:
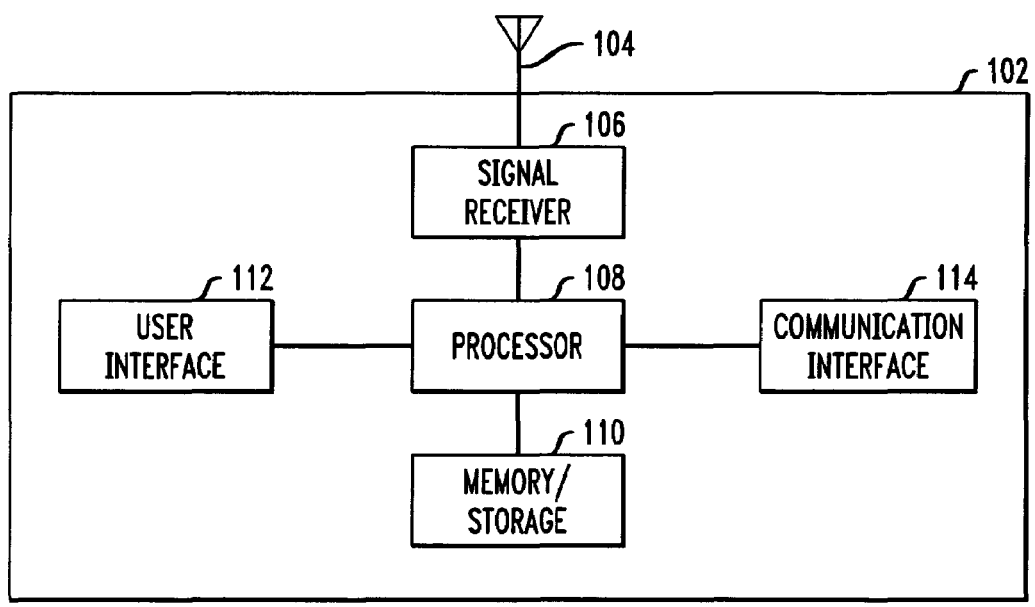
FIG. 1A is a high level block diagram of the components of a rover navigation unit.

A high level block diagram of the components of a rover navigation unit 102 is shown in FIG. 1A. The rover navigation unit 102 includes an antenna 104 for receiving satellite signals from a constellation of visible navigation satellites. The signals are processed by a signal receiver 106 and the output of the signal receiver 106 may be provided to a processor 108 for further processing. The rover navigation unit 102 also includes a communication interface 114 for communicating with other devices via a communication channel. Rover navigation unit 102 may also contain user interface 112 elements (e.g., keypad, display, etc.) in order to allow interaction with a user of the rover navigation unit 102. The processor 108 controls the overall functioning of the rover navigation unit under the control of computer program instructions stored in memory/storage 110. It is to be understood that FIG. 1A is meant to show a high level functional block diagram of a rover navigation unit for purposes of illustrating the principles of the present invention. There are, of course, other elements not shown which would be present in a rover navigation unit. Given the description herein, one skilled in the art would readily understand how to modify a well known rover navigation unit in order to implement the principles of the present invention.

Figure 1B:
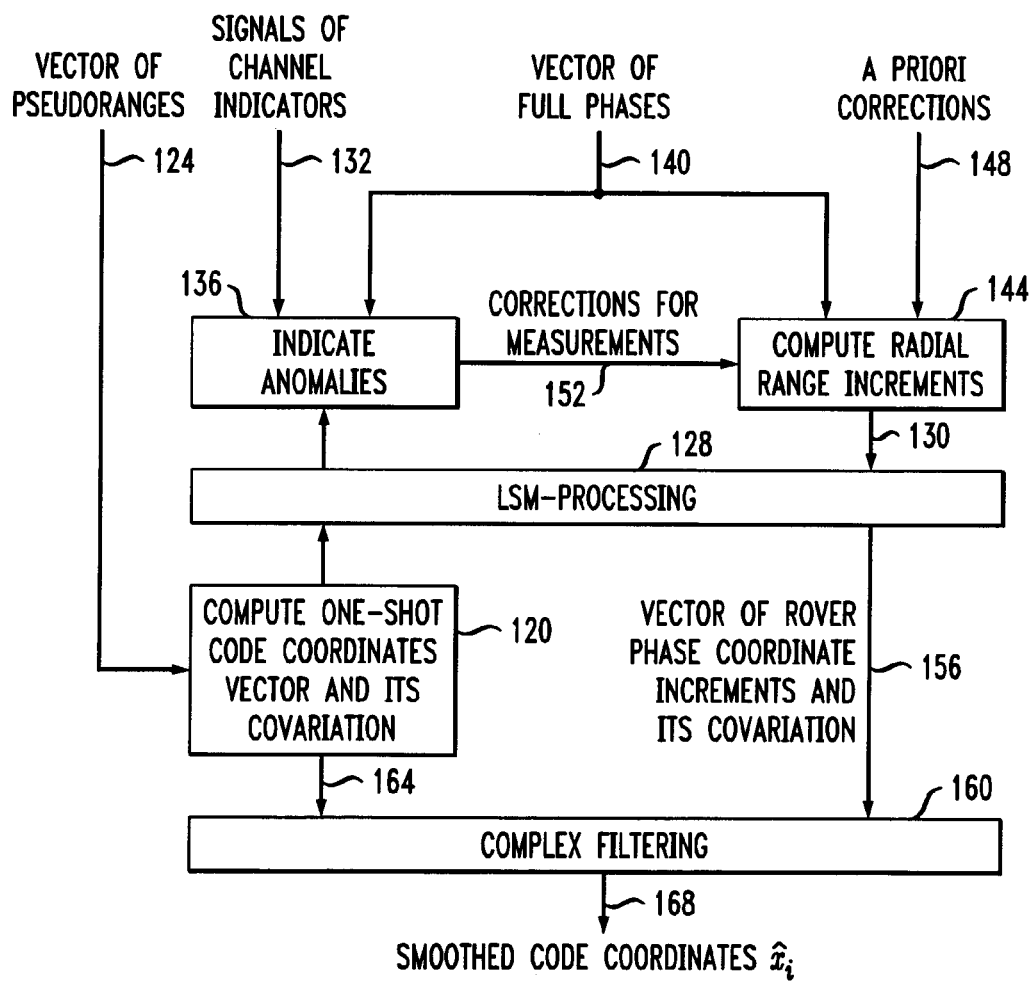
FIG. 1B is a flow chart illustrating the steps for determining smoothed code coordinates in accordance with an embodiment of the present invention.

FIG. 1B is a flow diagram of the smoothing process. The rover navigation unit computes a one-shot code coordinates vector and its covariation in step 120 upon receiving a vector of pseudoranges 124. A one-shot code coordinates vector is the vector that is calculated using pseudoranges of many satellites for one epoch without using any data from previous epochs. Least squares method (LSM) processing 128 is performed on the one-shot code coordinates vector and its covariation and the output is then used with signals of channel indicators 132 to indicate anomalies in step 136. A vector of full phases 140 is also used to determine anomalies.

To indicate anomalies in step 136, the rover navigation unit 102 analyzes carrier phase scatter for different channels which corresponds to the measured phase coordinate increment. If the scatter exceeds a permissible threshold, the measured phase coordinate increment is considered unreliable at the given epoch. This indicates that there may be a cycle slip or other anomalies. The next objective when indicating anomalies is to locate and eliminate the measurements of an affected channel. This can be achieved by the method of successive approximations, which is based on analyzing indications that indirectly identify the most probable channels that contain anomalies. The measurements of these channels are gradually eliminated.

To smooth coordinates derived from pseudoranges 124, measured radial range increments are computed in step 144. The radial range increments are determined from the vector of full phases 140, a priori corrections 148, and corrections for measurements 152 received from the anomaly determination of step 136.

LSM processing is then performed in step 128 on the radial range increments 130 for each epoch. First, rover phase coordinate increments and its covariation 156 are separately computed with full carrier phases based on visible satellites. Then, abnormal measurements are removed from the carrier phase increments. At each epoch, those satellite channels measurements which contain cycle slips or other abnormal errors are eliminated.

To detect a cycle slip, a number of methods can be used. In one embodiment, one criterion (which is applicable as the entire constellation participates in computing rover phase coordinate increments) is based on the redundancy of satellites in the constellation according to the carrier phase increments that have been determined.

The one-shot code coordinates 164 and the phase coordinate increments 156 are then subject to complex filtering in step 160. This results in more accurate smoothed code coordinates 168 of a mobile rover. There are various ways of performing the complex filtering. It should be noted that in designing complex filters or smoothing algorithms, one design criteria is how optimal the filter performs. In particular, many known "optimal" solutions are based on the assumption that the main cause of errors is white noise. That is, errors of subsequent samples or epochs are supposed to be independent (errors are mutually independent). Noise, however, may be one possible cause of error, but it is often far from the most significant cause. It should be noted that the robustness of a smoothing algorithm is typically the most important feature. To achieve robustness, optimal or quasi-optimal algorithms are corrected empirically using test results.

Below, there is a description of complex filters that enables the obtaining of more accurate coordinates in a severe environment, for instance, when a mobile rover moves among trees.

2. Basic Algorithm of a Complex Filter

The complex filtering performed in step 160 enables the determining of coordinates using the least squares method (LSM). The rover code coordinates vector $x_c$ is derived from an N-dimensional vector of measured pseudo-ranges r 124 by multiplying matrix G by r.

where $G=[H^T R^{-1} H]^{-1} H^T R^{-1}$

N is the number of satellites in the constellation

H is the matrix of directional cosines supplemented by a unit column

R is the weight coefficient defined by a priori pseudo-range accuracy estimate for the given channel.

The estimate of code coordinate accuracy can be simultaneously obtained in the form of covariance matrix $P=[H^T R^{-1} H]^{-1}$. Similarly, it is possible to get the vector of phase coordinate increments of rover coordinates dx over an epoch and an estimate of covariance matrix $\Delta P$ using an N-dimensional vector of full phase increments $d\phi$ for two neighboring epochs. Hereafter, the lower subscript c refers to code measurements, and p refers to phase measurements.

Complex filtering is implemented as a result of the following steps:

a) obtaining one-shot code solution that is $x_{1c}$ rover's vector of code coordinate and its covariation (covariance) $\check{P}_1$ (code accuracy estimate) where $\check{P}_1=[H_1^T R_K^{-1} H_1]^{-1}$ by processing LSM vector of code pseudo-ranges for the first epoch $r_1$;

b) obtaining an estimate vector of rover coordinate increments $dx_2$ (vector $dx_2$ is the vector of phase coordinates increments) over epoch and covariation $\Delta P_2$ (which is an estimate of carrier phase accuracy) by processing LSM vector of full phase increments $d\phi_2$ from the first to the second epochs (after abnormal measurements have been eliminated);

c) generating a "prolonged" code estimate for the coordinate at the second epoch $\overline{x}_2 = x_{1c} + dx_2$ and its covariation $\overline{P}_2 = \check{P}_1 + \Delta P_2$;

d) obtaining a new one-shot code estimate $x_{2c}$ and its covariation $\check{P}_2$ by processing LSM vector $r_2$ of code pseudo-ranges at the second epoch;

e) deriving a final (smoothed) estimate $\hat{x}_2$ at the second epoch by weight summation of prolonged code estimate $\overline{x}_2$ (with covariation $\overline{P}_2$) and one-shot code estimate $x_{2c}$ (with covariation $\check{P}_2$): $\hat{x}_2 = W_2 \overline{x}_2 + (E-W_2) x_{2c}$, where $W_2 = \check{P}_2 (\overline{P}_2 + \check{P}_2)^{-1}$, E is the unit matrix.

The covariation of the final smoothed estimate at the second epoch is $P_2 = [\overline{P}_2^{-1} + \check{P}_2^{-1}]^{-1}$.

It is noted that functional block diagrams (e.g., FIGS. 1B-4) herein are meant to describe high level functioning. One skilled in the art would readily recognize that some of the blocks represent input parameters, others represent output parameters, while others represent some function or operation. The functions and operations may be performed by hardware circuits, software instructions executing on a processor, or some combination of hardware and software. Given the description herein, those skilled in the art would be able to implement the described functionality using various combinations of hardware and software. As such, implementation details of the functions described herein will not be described in detail as such implementation details would be readily known to one skilled in the art.

Figure 2:
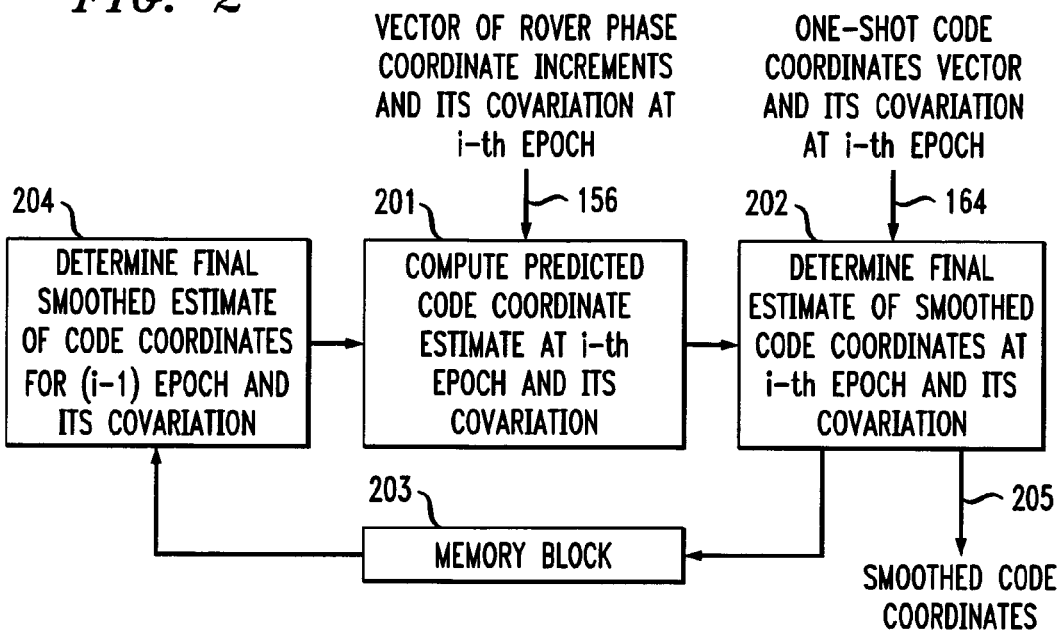
FIG. 2 is a flow chart illustrating the algorithm executed by a filter to determine the smoothed code coordinates in accordance with an embodiment of the present invention.

In the general case and referring to FIG. 2, a final smoothed estimate $\hat{x}_{i-1}$ with covariation $P_{i-1}$ is determined in step 204 by processing the previous (i−1)-th epoch. Then, using carrier phase measurements at the i-th epoch, an estimate $dx_i$ of phase coordinate increments 156 from (i−1)-th to i-th epoch with covariation $$\Delta P_i = [H_i^T R_P^{-1} H_i]^{-1} \tag{1}$$

is determined.

Further, a prolonged (extended) code coordinate estimate $\overline{x}_i = \hat{x}_{i-1} + dx_i$ for the i-th epoch with covariation (covariance)

$$\overline{P}_i = P_{i-1} + \Delta P_i \tag{2}$$

is determined in step 201.

One-shot code estimate $x_{ic}$ 164 at the i-th epoch with covariance $$\check{P}_i = [H_i^T R_C^{-1} H_i]^{-1} \tag{3}$$

is defined. A final estimate of the smoothed code coordinates at the i-th epoch $$\hat{x}_i = W_i \bar{x}_i + (E - W_i) x_{ic} \quad (4)$$

$$\text{with covariation } P_i = [\bar{P}_i^{-1} + \tilde{P}_i^{-1}]^{-1} \quad (5)$$

$$\text{where weight is } W_i = \tilde{P}_i [\bar{P}_i + \tilde{P}_i]^{-} \quad (6)$$

is determined in step 202.

The final estimate is stored in a memory block 203 for use at the following epoch in step 204. Thus, the described recursive procedure enables a smoothed code coordinates vector $\hat{x}_i$ 205 of a mobile rover that moves in an arbitrary way to be computed without a priori data about rover dynamics. This procedure is the basis of the complex filtering algorithm.

The algorithm does not consider the correlation between neighboring measurements of phase coordinate increments. This correlation is not only due to interference and fading caused by reflected signals, but is also due to the fact that the same full phase sample is used for generating the two neighboring phase increments.

The algorithm above is based on the recursive LSM and uses a calculated matrix weight coefficient $W_i$ for smoothing. This weight coefficient changes in time and takes the following factors into account:

Extent of smoothing increases as the time from the beginning of observation elapses. The major (diagonal) term of matrix $W_i$ increases and, correspondingly, the term of $(E-W_i)$ matrix decreases. Hence, the influence of the following one-shot code coordinate measurement $x_{ic}$ on $\bar{x}_i$ is often insignificant Change in the constellation geometry due to satellite movements, their risings and settings or shading observed; it affects matrices H and R.

Correlation between orthogonal projections of the calculated coordinate vector.

3. Correction of Basic Algorithm

It has been experimentally found that the algorithm above can be made more robust by incorporating some corrections derived from the comparison of measured coordinates at the same fixed points which are marked on the ground when a rover comes by these points more than once.

a) Choice of Weight Coefficients

First, we have to decide how to select weight coefficients of satellite channels $R_C$ which are a priori given in the formulas of complex filters. Coefficient $R_C$ may be proportional to the sine of the elevation angle. The greater the $R_C$, the higher the quality estimates of code measurements for a channel under consideration. These estimates of code measurements can be additionally corrected if there is information about satellite health. It is useful to reset (i.e., set equal to zero) weight coefficients of rising and setting satellites at elevation angles below 5 . . . 10 degrees.

Coefficient $R_P$ in the expressions for the complex filter is used for calculating covariation of phase increments $\Delta P_i$. Assuming that relative quality of satellite channels is the same for code and phase observations, let $\Delta P_i = m P_{i-1}$ where m<1 characterizes more accurate phase measurements than code measurements. In the extreme case, the estimate is extrapolated to the next epoch without introducing additional errors (i.e., m=0). In this case, smoothing takes features of recursive averaging (or features of a narrow-band filter—a filter with a bandwidth narrowed with time) and lasts from the beginning of observation (major term of matrix $W_i$ increases monotonically and approaches one). If errors were only related to noise effects or some other rapidly changing fluctuations, the accuracy of smoothed coordinates would increase proportional to the time elapsed.

However, in practice, this is not always the case. Some additional factors prevent error reduction as smoothing time increases. One of the more important factors is the remaining anomalous measurements which the indicator of anomalies failed to eliminate completely. The longer recursive averaging lasts, the more probable an epoch with anomalous error in phase increments will arise. Such an error may affect all successive coordinate estimates.

The second factor is related to an unconsidered part of ionosphere delay which causes errors of different signs in code and phase measurements. The third factor is when the antenna of a mobile rover is turned. Due to the antenna rotation, polarization causes a corresponding carrier phase shift but does not affect code delay. If $0 \leq m \leq 1$, the complex filter will make its band narrower at the beginning of observation and then the band will be fixed. This could be preferable in severe operational conditions when there is lack of satellites or when observation sessions are very long.

b) Truncation of Weight Matrix Time Parameters

Timescale offset is to be regarded as the fourth component of the state vector. There is no need, however, for this offset to be used in the computation of the weight matrix $W_i$, and all the terms related to time offset should be truncated so that this matrix (for the determination of three coordinates) would become 3×3.

c) Improving Precision of Smoothed Coordinates

In calculating smoothed coordinates $\hat{x}_i$ according to (4), we have to consider that, in reality, a matrix of directional cosines H that is used for the calculation of weight matrix $W_i$ is computed from obtained measurements. As a result, the matrix of directional cosines H cannot be precisely defined. Its errors affect the smoothed coordinates $\hat{x}_i$ and, in turn, cause their errors.

Assume that, for these reasons, there is an error at the 6-th or 7-th decimal place. Take into account also that the nominal value of Cartesian components for coordinate vector $\bar{x}_i$ in the geocentric coordinate system almost always exceeds a few thousand kilometers. For this reason, errors of smoothed coordinates can reach sub-meter level.

During sessions in many applications, rover coordinates change considerably over less than tens of kilometers. Thus, there is no reason to directly smooth measured geocentric coordinates. Part of the errors can be avoided if we move the origin of coordinates after subtracting some constant values from the measured single-shot code estimates $x_{ic}$, thereby significantly reducing their absolute values. The obtained remainders are then smoothed. After that, reverse displacement of coordinates is performed by adding the constants previously subtracted to the output values.

d) Simplification of Weight Coefficient

Changes in the constellation and correlation between estimates of Cartesian coordinate components (as described above) do not have much influence on smoothing accuracy reached by processing measurements which the operator collects in the forest.

An increase in the extension of smoothing time significantly affects accuracy. It is possible to use a simplified algorithm to calculate $W_i$ as a scalar:

$$W_i = 1 - 1/i$$

4. Simplified Algorithm of Complex Filter

This algorithm is based on the technique of local coordinate determination described in U.S. patent application titled "Position Determination using Carrier Phase Measurements of Satellite Signals" having application Ser. No. 11/222,119 and filed on Sep. 8, 2005, which is incorporated herein by reference. Local coordinates (i.e., coordinates originated from a marker point on the ground which was fixed at the rover start) determining rover position at any point of the trajectory can be measured by a standalone, single-frequency receiver that tracks carrier phase increments while traveling from the marker point along a random trajectory.

Given additional differential corrections from the base, it is possible to improve the accuracy of local coordinates even if the coordinates of the base station are not precisely known. The determination of local coordinates based on phase increments (phase local coordinates) often provides more accuracy than the accuracy obtained from code measurements. This technique has specific advantages, but it also typically has shortcomings which confine the scope of use.

First, the user may need not only local coordinates but also geocentric coordinates of the rover (for some applications). There also arises a need for binding the marker point to the geocentric coordinate system. A difficulty arises when there is a need for associating two different local coordinate systems that previously had distinct (various) marker points.

It should also be noted that phase local coordinates cannot be measured when there is a sudden loss of phase tracking during movement. In this case, the marker point has to be returned to and the local coordinates have to be re-measured or, after the tracking has resumed, a new local coordinate origin has to be fixed and the origins of both coordinate systems have to be bound. Therefore, for a number of applications, it is useful to have a combined processing method enabling the transfer from local coordinates to geocentric coordinates and vice versa.

Figure 3:
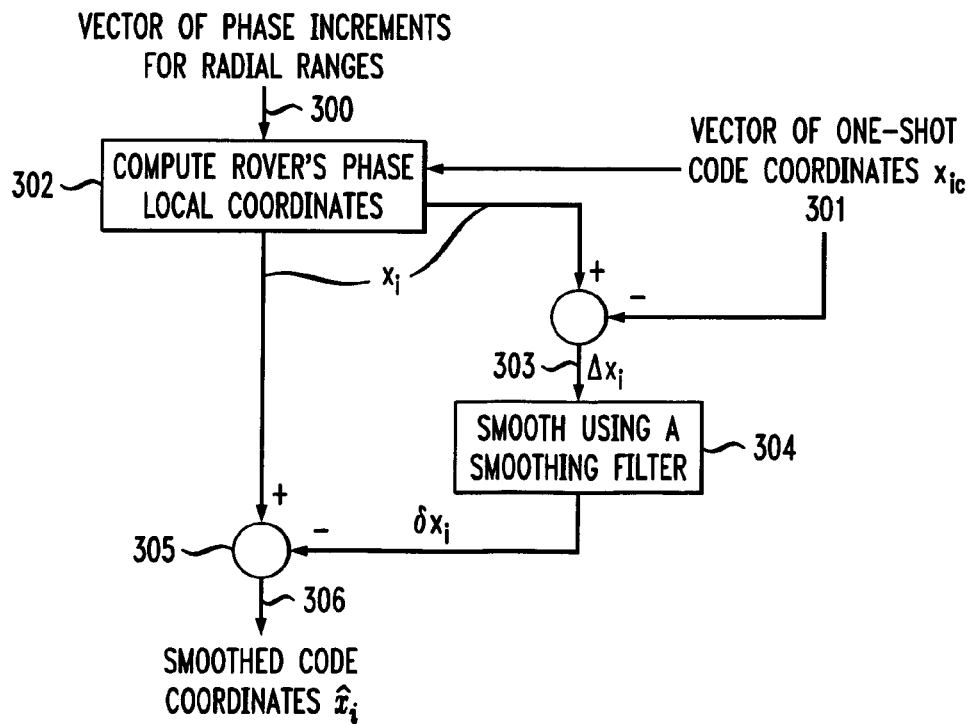
FIG. 3 is a flow chart illustrating an algorithm executed by the filter to determine the smoothed code coordinates in accordance with an embodiment of the present invention.
Figure 4:
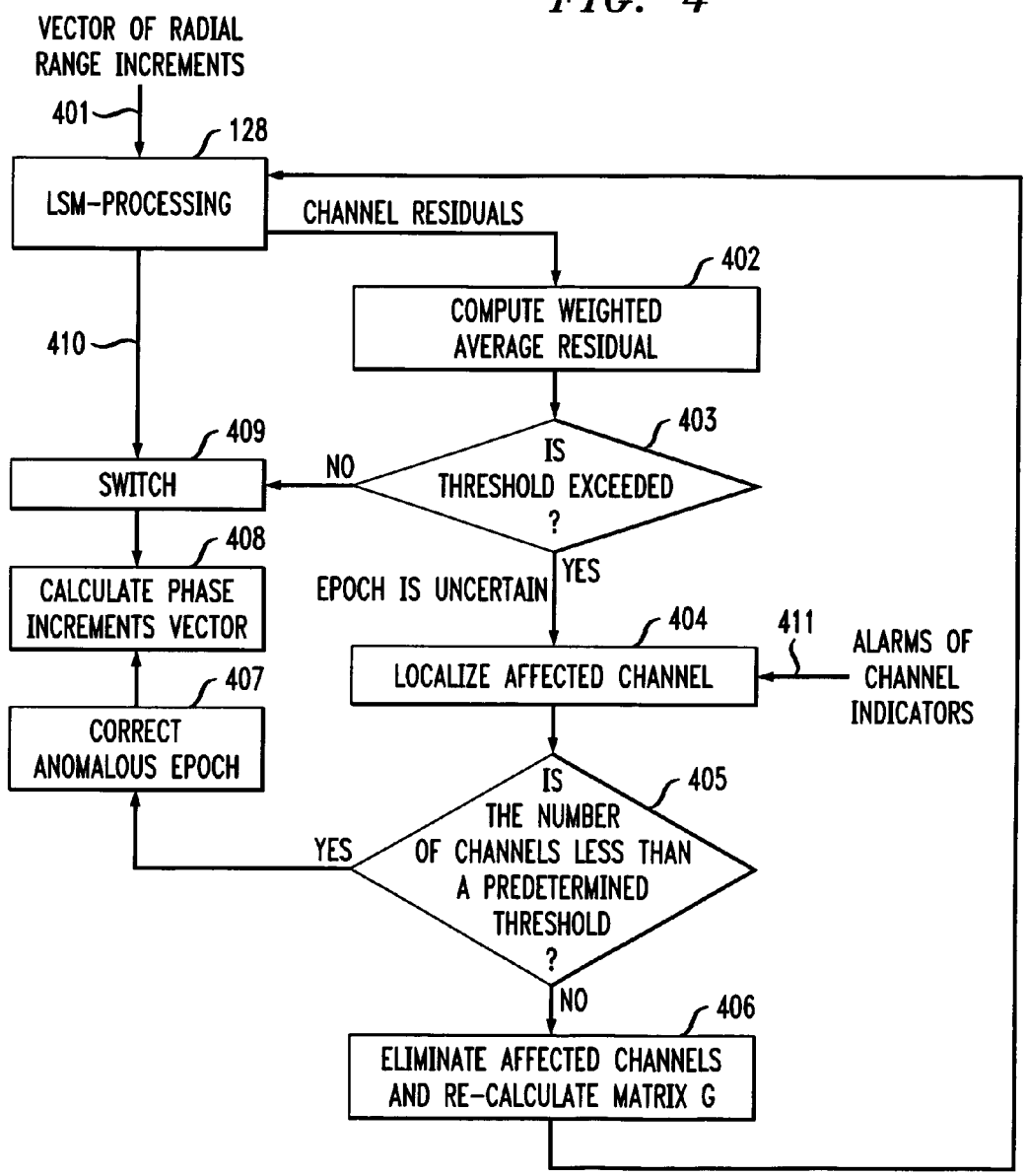
FIG. 4 is a flow chart illustrating an algorithm executed to indicate anomalies in accordance with an embodiment of the present invention.

Referring to FIG. 3, such a combined method can be efficiently implemented by a simplified algorithm of the complex filter which is used for smoothing code coordinates. A vector of phase increments for radial ranges 300 (as computed in step 144) is provided as input to compute the rover's phase local coordinates in step 302. Specifically:

1. At the i-th epoch, a vector of rover one-shot code coordinates $x_{ic}$ 301 is generated by processing LSM measured pseudo-ranges (as shown in step 120).
2. A vector of the rover's phase local coordinates $x_i$ 302 is generated at the same epoch using the method described in above mentioned U.S. patent application Ser. No. 11/222,119 and filed on Sep. 8, 2005. In different situations, the results of the first two stages can be regarded as final results independent of each other. When there is a need for smoothing code coordinates, processing continues at the third stage.
3. Difference of vectors of phase local coordinates and one-shot code coordinates $\Delta x_i$ 303 is determined:

$\Delta x_i = x_i - x_{ic}.$

The obtained difference vector does not contain any changes related to rover motion, and its fast fluctuations mainly result from errors in code measurements. These can be smoothed in step 304 with a smoothing filter using an operator $L(\Delta x_i)$:

$\delta x_i = L(\Delta x_i)$

4. At the fourth stage, smoothed code coordinates 306 are restored in a difference block 305

$\hat{x}_i = x_i - \delta x_i$

It should be noted that, at stages 3 and 4, the signs can be simultaneously changed.

a) Variants of Smoothing Filters

During short sessions, smoothing can be carried out as recursive averaging:

$\delta x_i = \delta x_{i-1}(1 - 1/i) + \Delta x_i (1/i).$

During longer sessions, to avoid accumulation of abnormal errors and some other previously mentioned factors, it is typically better to use a smoothing filter with finite memory. For instance, we can use the moving average method or a recursive expression for a digital filter of the first order: $\delta x_i = \delta x_{i-1} + K_P(\Delta x_i - \delta x_{i-1})$, where $K_P < 1$ is the coefficient reciprocal to a time constant of the digital filter (initial value should be taken as $\delta x_0$).

It is often preferable to use a smoothing filter of higher orders (e.g., second or third order). For instance, the second order digital filter performs smoothing by the following recurrent expressions:

$\Delta x_i = x_i - x_{ic}.$ $dx1_i = \Delta x_i - \delta x_{i-1}$ $dx3_i = dx3_{i-1} + K_p1 \cdot K_p2 \cdot dx1_i$ $dx2_i = Kp1 \cdot dx1_i + dx3_i$ $\delta x_i = \delta x_{i-1} + dx2_i$ $\hat{x}_i = x_i - \delta x_i$, where preferable values are $K_P1 = 0.2$, $K_P2 = 0.1$ (the initial value should be taken as $\delta x_0 = \Delta x_1$, $dx3_0 = 0$, at i=1).

5. Coordinate Smoothing in Differential Mode

With the help of two navigation receivers, one of which is stationary (i.e., a base) and the other which is mobile (i.e., a mobile rover), rover coordinates can be smoothed with more accuracy than previously attainable both in real time and in post-processing. Real time measurements need a base-rover communication link. In post-processing, two recordings are co-processed.

Single differences of measured increments of radial ranges are determined by subtracting rover radial range increments from base radial range increments for each satellite. In a similar way, single differences are calculated using satellite coordinates determined according to the rover clock.

The indicator of anomalies eliminates measurements of those satellites and epochs which had anomalous errors in either base or rover receivers or communication links. Then, residuals of single differences are generated by subtracting calculated values from measured ones and applying the correction for clock offset.

LSM processing allows rover smoothed coordinates (based on code and phase measurements) to be determined in differential mode in which highly-correlated base and rover error components are suppressed.

6. Functions and Operating Principles of Indicator of Anomalies

An indicator of anomalies, which is designed to clear phase coordinate increments of anomalous errors, plays a primary role in enhancing the accuracy of smoothing coordinates. There are a number of ways to design anomalies indicators, but none of them is universal and provides absolute reliability in various environments. In the present application, we propose an indicator of anomalies that produces accurate results while operating in a single-frequency receiver in severe conditions when there is strong multipath and frequent shadings of satellites by local objects.

There are two objectives for the indicator of anomalies. The first objective is to detect an epoch at which the measured phase increment is unreliable or uncertain. This means that there may be anomalies in some satellite channels. If this is the case, the second objective will be implemented—localization of affected channels where the anomaly is most probable. According to the anomalies indicator decision, the measurements of affected channels at the marked epoch can be excluded from processing.

The algorithm of the indicator of anomalies can impose limitations. First, channel measurements are allowed to be eliminated if the number of remaining channels exceeds a permissible minimum. Second, the processor load due to indicator calculations should be within determined limits.

7. Detection of Uncertain (Unreliable) Epoch

To determine coordinate increments at the i-th epoch, full phase measurements are used only for such satellite channels that have measurements at the i-th and (i−1)-th epochs. If there was no measurement at the (i−1)-th epoch in some channels, then phase measurements for the i-th epoch in the above channels will be used only for obtaining increments at the (i+1) epoch.

An uncertain epoch is the i-th epoch for which the scatter of residuals at calculating LSM phase coordinate increments appears to be too large. The algorithm to verify the compliance with this condition consists of a number of successive operations, shown in FIG. 4.

A navigation receiver receives signals from the constellation of N satellites and, at each epoch, outputs measurements of full phases and pseudo-ranges. These measurements are then added with corrections for atmosphere delays. Using full phase measurements $\phi_i[j]$ (where j is the channel number, $1 \leq j \leq N$, $i \geq 2$), phase increments $\phi_i[j]$ from the (i−1)-th to i-th epochs are determined. These values multiplied by carrier wavelength ($\lambda$) produce a vector of radial range increments $d\Phi_i[j]$. If phases are measured in cycles and wavelength in meters, measured satellite radial range increments at the i-th epoch will be defined as follows:

a) Calculating radial range increments $$d\phi_i[j] = (\phi_i[j] - \phi_{i-1}[j])\lambda$$

b) Determining calculated ranges D from the rover to the j-th satellite at i-th and (i−1) epochs $$D_i[j] = ((X_i[j] - x_{ic})^2 + (Y_i[j] - y_{ic})^2 + (Z_i[j] - z_{ic})^2)^{0.5}$$

$$D_{i-1}^k[j] = ((X_{i-1}[j] - x_{ic} - dx_i^k)^2 + (Y_{i-1}[j] - y_{ic} - dy_i^k)^2 + Z_{i-1}[j] - z_{ic} - dz_i^k)^2)^{0.5}$$

where $dx_i^k$, $dy_i^k$, $dz_i^k$ are the defined rover coordinate increments at the k-th iteration (initial coordinate increments may be 0 with k>=1).

$X_i[j]$, $Y_i[j]$, $Z_i[j]$ are Cartesian coordinates of satellites in the geocentric coordinate system (meters).

c) Calculating the correction for Earth rotation $$E_i[j] = C_e * (X_i[j] * y_{ic}^k - Y_i[j] * x_{ic}^k - (X_{i-1}[j] * (y_{ic}^k - dy_i^k) - Y_{i-1}[j] * (x_{ic}^k - dx_i^k))$$

where $C_e = 2.432387791e-13$ d) Calculating residuals of radial increments ($Nev_i^k[j]$) as a difference between measured and calculated radial range increments 401

$$Nev_i^k[j] = d\phi_i[j] - (D_i[j] - D_{i-1}^k[j]) + E_i^k[j] - q_i^k,$$

where $q_1^k$ takes into account clock offset at the k-th iteration (the initial offset is assumed to be zero)

e) Calculating corrections for rover coordinate increments and clock offset by the LSM processing 128

$$\Delta_i^k = G_i * Nev_i^k$$

where $Nev_i^k$ is the N-dimensional vector of increment residuals at k-th iteration 401;

$\Delta_i^k$ is the four-dimensional vector of corrections for the three coordinate increments of rover and clock offset having components $\Delta x_i^k$, $\Delta y_i^k$, $\Delta z_i^k$, $\Delta q_i^k$ at k-th iteration.

$G_i$ is the LSM transformation matrix f) Correcting initial values of rover coordinate increments $$dx_i^k = dx_i^{k-1} + \Delta x_i^k, \ dy_i^k = dy_i^{k-1} + \Delta y_i^k, \ dz_i^k = dz_i^{k-1} + \Delta z_i^k,$$
$$dq_i^k = dq_i^{k-1} + \Delta q_i^k$$

Absolute values of corrections obtained in (e) are compared with a threshold. If at least one of the corrections exceeds the threshold, k will be incremented by 1, the next iteration will be performed, and the algorithm returns to (b).

When the corrections are less than the threshold, the iterations will stop and obtained values $dx_i^k$, $dy_i^k$, $dz_i^k$ (at k reached) are phase coordinate increments of the rover $dx_i$, $dy_i$, $dz_i$ measured at the i-th epoch to the first approximation 410. This means that such corrections were obtained when iterations were stopped and the number of iterations k reached its maximum value.

A weighted average residual is computed in step 402. The computation of the weighted average residual includes measuring residuals moduli absNEVi[j]) obtained in (d) after iterations have stopped and calculating the weighted average residual $M_{nev\ i}$ at the i-th epoch $$M_{nev\ i} = \left(\sum_{j=1}^{N} (absNEVi[j] * MR_{Ki}[j])^2\right)^{0.5}$$

where $MR_{Ki}[j]$ is the relative residual weight of the j-th channel at i-th epoch $$MR_{Ki}[j] = R_{Ki}[j] \bigg/ \left(\sum_{j=1}^{N} (R_{Ki}[j])\right).$$

$M_{nev\ i}$ is compared with a threshold in step 403. If the threshold is exceeded in step 403, i-th epoch is regarded as uncertain and subject to correcting. This starts the process of localizing the affected channel(s) in step 404. This step receives as input alarms of channel indicators 411.

Further, there are two techniques. First, the epochs that do not exceed the threshold are considered reliable or certain and switch 409 opens. The rover coordinates are measured and the phase increments vector is calculated in step 408.

The second technique is that validation occurs and the mark of epoch unreliability is considered along with alarm signals of other indicators.

8. Localization of a Channel with Anomalous Measurement for Uncertain Epochs The final aim of localization is to exclude the measurements of the channels with anomalies from the determination of phase coordinate increments. However, this is only possible when the number of remaining satellites is not less than a predetermined amount (e.g., 4 or 5).

The number of channels are determined and compared with a predetermined threshold in step 405. If the number of channels is not sufficient (i.e., less than the predetermined threshold), then further actions stop and the anomalies indicator outputs a message about anomalous epochs. If the number of channels is greater than the predetermined threshold, then the measurements of the affected channels are eliminated and matrix $G_i$ is recalculated in step 406. The process then repeats itself, returning to the LSM processing step 128. The details of these steps are as follows:

a) Localization by Direct Searching

Localization can be achieved by direct searching. Direct searching is when affected channels are excluded from processing in turn, matrix $G_i$ is re-calculated considering a smaller channel number, and the process goes on verifying the same epoch. As an anomaly often occurs in some channels, perhaps different combinations of channel pairs may have to be checked, then channel triples, etc. The process ends when a decision about reliability or unreliability (i.e., an anomaly) of the epoch is made. Direct searching often requires a lot of time to re-calculate matrices and can overload the processor. That is why it is often used for Post-processing rather than for Real-time processing.

b) Indirect Indications of Affected Channels

It is possible to simplify localization if successive checking of channels is performed in those channels which are supposed to be more suspicious. There are a lot of indirect indications of different importance. Indicators of indirect indications can typically be divided into two groups. The first group, called channeled indicators, is based on radio signal parameters which can be measured in satellite channels of the receiver. The group of channel indicators includes an indicator of signal-to-noise ratio and an indicator of PLL phase discriminator output.

Main parameters should be selected for each indicator—a sensitivity threshold and a time constant of the filtering system (smoothing time). Signal-to-noise indicator measures a ratio of signal strength to the strength of fast fluctuations (noise and some others) in the band of 1 Hz. This indicator outputs alarm signals when a measured value is below a determined threshold.

An indicator of the output of the phase discriminator (PD) estimates PLL tracking error and outputs alarm signals when a measured value exceeds a specified threshold. The second group—deviation indicators—is based on phase measurements which may be detected in their processing over the satellites. This group includes an indicator of sudden changes in radial range increments and an indicator of channel residuals.

An indicator of sudden changes for each channel determines a difference in measured radial range increments for neighboring epochs $(d\phi_i[j]-d\phi_{i-1}[j])$ and compares its absolute value with a threshold. The threshold is proportional to the epoch duration and is selected such that the desired changes due to moving satellites and the rover do not exceed the threshold. An indicator of channel residuals defines absolute values of residuals $Nev_i[j]$ and compares them with the threshold. Both indicators output alarm signals when a measurement exceeds the threshold.

c) Combining Alarm Signals and Improving Accuracy of Coordinate Increments

The navigation receiver can employ all of the mentioned indicator types. Each of them can have false alarms and missing anomalies. Depending on the situation, alarm signals can vary and can refer to one or more of the different channels. At each epoch being corrected, by combining alarm signals, the anomaly indicator selects measurements of a few affected channels (for instance, one or two) to be eliminated. Correspondingly, matrix $G_i$ is re-calculated, the following approximation to calculate coordinates is carried out, and again the reliability of the epoch is checked. Subsequent checks can result in excluding more channels, and the process repeats itself. Thus, the precision of rover coordinate increments is improved after a series of successive approximations. If anomalous measurements are present in some channels, the number of verification procedures needed to locate the anomalies is no more than the number of affected channels. This is much more efficient than it is in direct searching.

Alarm signals (i.e., alarms of channel indicators 411) can be combined in different ways. One of them is to assign the weight of each indicator a positive number and then to sum all of the weights. At the next check, a channel with maximal weight sum is eliminated. Indicator weights may be assigned by the user depending on the operation environment and parameters that characterize indicator sensitivity.

For instance, in one of the experiments done, for a mobile receiver in the forest, positive results on clearing anomalies were achieved at the indicator parameters shown in Table 1:

TABLE 1

| Indicator | Parameters of indicator | | |
|---|---|---|---|
| | threshold | Filtering | weight |
| Signal-to-noise indicator | 28-30 dB.Hz | Smoothing time from 1 to 30 s | 1 |
| PLL PD output indicator | 0.04-0.06 Cycles | 0.4-1.0 s. | 3 |
| Indicator of sudden changes in radial range increments | 0.8-1.2 m/s | — | 5 |
| Indicator of channel residuals | 0.18-0.2 m | — | 4 |
| Indicator of weighted average residual | 0.04-0.06 m | — | — |

If a receiver does not provide for channel indicators, it is possible to use only deviation indicators. For instance, there is a way at which, at an unreliable epoch, a channel with maximal modulo (i.e., absolute value) of channel residual is considered to be affected. Another way is to regard a channel with maximal sudden change in radial range increments as an affected channel (if sudden change exceeds the threshold). Some other ways of combining different indicators are possible too, at which the measurements of one or more channels are eliminated at each successive check until the channel number is too small (e.g., less than 4 or 5). If the weighted average residual (computed in step 402) does not exceed the threshold in step 403, the switch 409 enables measurement results 410 to pass to the phase increments meter to calculate the phase increments vector in step 408.

9. Localization of a Channel with Anomalous Measurement Using the Alarm Signals of the Indicator of Anomalies The mark which is used for the first method to detect an unreliable epoch (when the sum of residual squares (or weighted average residuals) exceeds the threshold) is often insufficient.

If the threshold is exceeded according to this mark, this fact correctly shows an unreliable epoch. However, if the threshold is not exceeded, it does not mean that there is no abnormal measurement. The sum of squares of residuals can be regarded as a feature or mark (in particular, when the receiver operates in an adverse environment) which can be considered along with some other marks. The second method of processing allows abnormal measurements to be eliminated by computations.

More Reliable Indicator of Anomalies

Input values of such an indicator are also the increments over epoch of radial ranges from rover to satellites measured by full phase increments.

If, at the i-th epoch there is no measurement, the next increment is calculated at the (i+2)-th epoch.

Increments (over epoch) of radial ranges are processed with LSM (they are multiplied by matrix G0). As a result, we have the first approximation for rover coordinate increments and corresponding residuals showing variation/scatter of the measured phases.

The proposed indicator rectifies measurements at each epoch (where phase increments have been determined). More reliable operation of the indicator of anomalies is achieved by the following specific features:

- Clearing abnormal measurements is based on the information from channel indicators which can give alarm signals even at those epochs where the residuals were small;
- If the number of satellites is insufficient, measurements of the channels with large residuals are eliminated;
- Verification of the measured rover coordinate increment over epoch is introduced on the basis of a priori data about maximum possible velocity of the rover.
- Most eliminations are made without matrix recalculations.

The process of clearing data from abnormal measurements contains four steps. The first step of clearing considers only alarm signals of channel indicators. (a) Satellites, channels of which contain alarm signals of the phase channel indicator (PLL_PD) or satellites, channels of which have the measured signal-to-noise value less than threshold Π1 (preferable value of Π1 is 28 dBHz) are isolated. (b) the isolated satellites are ranged according to the absolute value of residuals, the number of active satellites is calculated, and satellite measurements with greatest residuals are eliminated if the number of the remaining satellites is at least 5. If it is not the case, the algorithm comes to the next epoch. (c) step (b) is performed again until the number of satellites becomes 5 or all the measurements from the satellites marked with alarm signals are eliminated. (d) Matrix G0 is recalculated considering the number of the remaining satellites (matrix G1).

The second step of clearing starts as the first one but instead of G0 matrix G1 is used. We obtain the second approximation. At the second stage the following operations are performed: (a) Satellites for which the difference of increments measured in phase of radial ranges to the satellite for two neighboring epochs exceeds threshold Π2 (preferable value Π2=1 m.) are additionally isolated. (b) The isolated satellites are ranged by the absolute value of residuals, the number of active satellites is calculated, and satellite measurements with the greatest residuals are eliminated, but only if the number of the remaining satellites is at least 5. If it is not the case, the algorithm comes to the next epoch. (c) Step (b) repeats until either the number of the remaining satellites is 5 or all the measurements from the satellites marked with alarm signals are eliminated.

The third step of clearing starts from using matrix G1 for LSM processing and the third (the final) approximation is obtained. (a) The value of weighted average residuals is determined at this epoch; if it exceeds threshold Π3 (preferable value Π3=0.05 m.), step (b) is performed, otherwise—transfer to the next epoch. (b) all the satellites remaining after the previous clearing steps are ranked by the absolute values of residuals, the number of active satellites is calculated, and satellite measurements with greatest residuals are eliminated but only if the absolute value of residual (residual modulus) exceeds threshold Π4 (preferable value Π4=0.2 m) and, at that, the number of the remaining satellites is at least 5. Otherwise—transfer to the next epoch. (c) Matrix G1 is recomputed for the number of the remaining satellites, hence we get matrix G2.

The third step of clearing may continue by repeating step (a), but matrix G2 is used for LSM and the third approximation is obtained. Further, steps (b) and (c) are performed again and/or the measurements of another satellite are eliminated (after that matrix G3 will be recomputed again and so on) or the elimination of satellite measurements is stopped. Elimination will normally stop when matrix G2, or G3 has been obtained.

The fourth step of clearing checks the measurements of the satellites remaining after the previous steps and, once LSM processing has completed, the availability of anomalies is verified for the epoch in consideration. An epoch is regarded as anomalous if the increments obtained of rover plane coordinates over second (i.e., the time interval) exceed threshold Π5. This threshold is selected on the assumption that the rover cannot move fast, for instance, for a walker/foot passenger, the preferable value Π5=2-3 m).

Another mark of unreliability is based on the comparison of phase coordinates and smoothed local code coordinates. Under standard operation, the difference between them should not exceed threshold Π6 (preferable value Π6=10 m).

9. Decision-Making at Anomalous Epoch

When there is no correction of measured coordinate increments at the i-th epoch by eliminating satellites and the indicator of anomalies generates a message about the anomalous epoch, there are two possible actions:

1. Extrapolate the Increment for the i-th Epoch on the Basis of Measurements of Previous Epochs.

Such a decision is justified if a rover moves smoothly enough and its movement can be predicted for a few following epochs. The prediction algorithm depends on the accepted motion model. In the simplest case, linear extrapolation is applied which uses increments of two preceding epochs. It means that the anomalous phase increment at the i-th epoch is replaced by $(2dx_{i-1} - dx_{i-2})$.

2. Inform the operator about an anomalous epoch and enable the operator to make a decision depending on the situation and mission (for instance, ignore anomalous epoch, stop the rover, re-measure, etc).

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for determining smoothed code coordinates of a mobile rover comprising:
   determining a vector of one-shot code coordinates of said mobile rover;
   determining a vector of phase increments by determining full phase differences for a plurality of navigation satellites at a time epoch and at a previous time epoch in a plurality of time epochs;
   determining, based on said full phase differences, a vector of radial range increments;
   determining a vector of rover phase coordinate increments using said vector of radial range increments; and
   filtering said vector of one-shot code coordinates and said vector of rover phase coordinate increments to determine, at each time epoch, smoothed code coordinates of said mobile rover.

2. The method of claim 1 wherein said determining of said vector of one-shot code coordinates further comprises processing an N-dimensional vector of pseudo-ranges from said mobile rover to N navigation satellites at each time epoch in said plurality of time epochs.

3. The method of claim 1 wherein said determining of a vector of radial range increments further comprises applying corrections for at least one of ionosphere and troposphere delay, Earth rotation, and predicted clock offset to said vector of radial range increments.

4. The method of claim 1 wherein said determining of a vector of radial range increments further comprises correcting said vector of radial range increments for an anomaly.

5. The method of claim 4 wherein said correcting said vector of radial range increments for an anomaly further comprises correcting said vector of radial range increments for at least one of an unreliable time epoch and a channel with an anomaly.

6. The method of claim 4 further comprising processing said corrected vector of radial range increments to obtain a 2-3-dimensional vector of rover phase coordinate increments and a correction for clock offset.

7. The method of claim 6 wherein said processing is performed using least squares method (LSM).

8. The method of claim 1 wherein said filtering of said vector of one-shot code coordinates and said vector of rover phase coordinate increments further comprises the steps of:
   a) calculating said vector of one-shot code coordinates and its covariance matrix by processing a vector of pseudo-ranges at said time epoch;
   b) calculating said vector of rover phase coordinate increments and its covariance matrix at said time epoch by processing a corrected vector of full carrier phases at said previous time epoch and said time epoch;
   c) calculating a vector of rover prolonged estimate of code coordinates and its covariance matrix at said time epoch by summing said vector of smoothed code coordinates at said previous time epoch and said vector of rover phase coordinate increments from said previous time epoch to said time epoch; and
   d) calculating a vector of said smoothed code coordinates and its covariance matrix at said time epoch by weighted summation of said vector of rover prolonged estimate of code coordinates and said vector of one-shot code coordinates.

9. The method of claim 7 wherein said determining of said vector of one-shot code coordinates and said determining of said vector of rover phase coordinate increments and their respective covariance matrix are determined by recursively executing said least squares method.

10. The method of claim 8 wherein said covariance matrix of said vector of rover phase coordinate increments is proportional to said covariance matrix of said vector of one-shot code coordinates and the ratio is less than one.

11. The method of claim 8 wherein said weighted summation uses covariance matrices of addends without terms related to timescale offset as weighting multipliers.

12. The method of claim 2, wherein said covariance matrix of phase coordinate increments is zero and corresponds to negligible errors in phase measurements.

13. The method of claim 8, wherein said weighted summation does not use measurements of covariance matrices while weighted coefficients of addends consider the number of epochs elapsed from the beginning of observation.

14. The method of claim 1 further comprising transforming said one-shot code coordinates from a geocentric coordinate system by a shift of a coordinate origin.

15. The method of claim 14 further comprising transforming said smoothed code coordinates of said rover into said geocentric coordinate system.

16. An apparatus for determining smoothed code coordinates of a mobile rover comprising:
   means for determining a vector of one-shot code coordinates of said mobile rover;
   means for determining a vector of phase increments by determining full phase differences for a plurality of navigation satellites at a time epoch and at a previous time epoch in a plurality of time epochs;
   means for determining, based on said full phase differences, a vector of radial range increments;
   means for determining a vector of rover phase coordinate increments using said vector of radial range increments; and
   means for filtering said vector of one-shot code coordinates and said vector of rover phase coordinate increments to determine, at each time epoch, smoothed code coordinates of said mobile rover.

17. The apparatus of claim 16 wherein said means for determining said vector of one-shot code coordinates further comprises means for processing an N-dimensional vector of pseudo-ranges from said mobile rover to N navigation satellites at each time epoch in said plurality of time epochs.

18. The apparatus of claim 16 wherein said determining of a vector of radial range increments further comprises applying corrections for at least one of ionosphere and troposphere delay, Earth rotation, and predicted clock offset to said vector of radial range increments.

19. The apparatus of claim 16 wherein said means for determining a vector of radial range increments further comprises means for correcting said vector of radial range increments from an anomaly.

20. The apparatus of claim 19 wherein said means for correcting said vector of radial range increments from an anomaly further comprises means for correcting said vector of radial range increments from at least one of an unreliable time epoch and a channel with an anomaly.

21. The apparatus of claim 19 further comprising means for processing said corrected vector of radial range increments to obtain a 2-3-dimensional vector of rover phase coordinate increments and a correction for clock offset.

22. The apparatus of claim 21 wherein said processing is performed using least squares method (LSM).

23. The apparatus of claim 16 wherein said filtering of said vector of one-shot code coordinates and said vector of rover phase coordinate increments further comprises the steps of:
  e) calculating said vector of one-shot code coordinates and its covariance matrix by processing a vector of pseudo-ranges at said time epoch;
  f) calculating said vector of rover phase coordinate increments and its covariance matrix at said time epoch by processing a corrected vector of full carrier phases at said previous time epoch and said time epoch;
  g) calculating a vector of rover prolonged estimate of code coordinates and its covariance matrix at said time epoch by summing said vector of smoothed code coordinates at said previous time epoch and said vector of rover phase coordinate increments from said previous time epoch to said time epoch; and
  h) calculating a vector of said smoothed code coordinates and its covariance matrix at said time epoch by weighted summation of said vector of rover prolonged estimate of code coordinates and said vector of one-shot code coordinates.

24. The apparatus of claim 22 wherein said means for determining said vector of one-shot code coordinates and said means for determining said vector of rover phase coordinate increments and their respective covariance matrix are determined by recursively executing said least squares method.

25. The apparatus of claim 23 wherein said covariance matrix of said vector of rover phase coordinate increments is proportional to said covariance matrix of said vector of one-shot code coordinates.

26. The apparatus of claim 23 wherein said weighted summation uses covariance matrices of addends without terms related to timescale offset as weighting multipliers.

27. The apparatus of claim 17, wherein said covariance matrix of phase coordinate increments is zero and corresponds to negligible errors in phase measurements.

28. The apparatus of claim 23, wherein said weighted summation does not use measurements of covariance matrices while weighted coefficients of addends consider the number of epochs elapsed from the beginning of observation.

29. The apparatus of claim 16 further comprising means for transforming said one-shot code coordinates from a geocentric coordinate system by a shift of a coordinate origin.

30. The apparatus of claim 29 further comprising means for transforming said smoothed code coordinates of said rover into said geocentric coordinate system.

* * * * *

UNITED STATES PATENT AND TRADEMARK OFFICE
CERTIFICATE OF CORRECTION

PATENT NO. : 7,439,908 B1
APPLICATION NO. : 11/429109
DATED : October 21, 2008
INVENTOR(S) : Mark I. Zhodzishsky, Victor A. Veitsel and Alexey Zinoviev It is certified that error appears in the above-identified patent and that said Letters Patent is hereby corrected as shown below:

Column 8, Line 10, "$P_1$", should read -- $\tilde{P}_1$ --.

Column 8, Line 11, "$P_1 = [H_1^T R_K^{-1} H_1]^{-1}$", should read -- $\tilde{P}_1 = [H_1^T R_K^{-1} H_1]^{-1}$ --.

Column 8, Lines 22 & 23, "$\overline{P}_2 = P_1 + \Delta P_2$", should read -- $\overline{P}_2 = \tilde{P}_1 + \Delta P_2$ --.

Column 8, Line 25, "$P_2$", should read -- $\tilde{P}_2$ --.

Column 8, Line 30, "$P_2$", should read -- $\tilde{P}_2$ --.

Column 8, Lines 30 & 31, "$W_2 = P_2(P_2 + P_2)^{-1}$", should read -- $W_2 = \tilde{P}_2(\overline{P}_2 + \tilde{P}_2)^{-1}$ --.

Column 8, Line 33, "$P_2 = [\overline{P}_2^{-1} + P_2^{-1}]$", should read -- $P_2 = [\overline{P}_2^{-1} + \tilde{P}_2^{-1}]^{-1}$ --.

Column 9, Line 8, "$W_i = \tilde{P}_i [\overline{P}_i + \tilde{P}_i]^-$", should read -- $W_i = \tilde{P}_i [\overline{P}_i + \tilde{P}_i]^{-1}$ --.

Column 10, Line 33, "$\hat{x}_i$;", should read -- $\hat{x}_i$ --.

Column 13, Line 41, "$\Phi_i[j]$", should read -- $d\varphi_i[j]$ --.

Column 13, Line 48, "$d\Phi_i[j] = (\Phi_i[j] - \Phi_{i-}[j])\lambda$", should read -- $d\Phi_i[j] = (\varphi_i[j] - \varphi_{i-1}[j])\lambda$ --.

CERTIFICATE OF CORRECTION (continued)
U.S. Pat. No. 7,439,908 B1

Column 13, Lines 55 & 56, " $D_{i-1}{}^k[j] = ((X_{i-1}[j] - x_{ic} - dx_i{}^k)^2 + (Y_{i-1}[j] - y_{ic} - dy_i{}^k)^2 + Z_{i-1}[j] - z_{ic} - dz_i{}^k)^2)^{0.5}$ ", should read -- $D_{i-1}{}^k[j] = ( (X_{i-1}[j] - x_{ic} - dx_i{}^k)^2 + (Y_{i-1}[j] - y_{ic} - dy_i{}^k)^2 + (Z_{i-1}[j] - z_{ic} - dz_i{}^k)^2 )^{0.5}$ --.

Column 13, Lines 65 & 66, " $E_i[j] = C_e * (X_i[j] * y_{ic}{}^k - Y_i[j] * x_{ic}{}^k - (X_{i-1}[j] * (y_{ic}{}^k - dy_i{}^k) - Y_{i-1}[j] * (x_{ic}{}^k - dx_i{}^k))$ ", should read -- $E_i{}^k[j] = C_e * ( X_i[j] * y_{ic}{}^k - Y_i[j] * x_{ic}{}^k - (X_{i-1}[j] * ( y_{ic}{}^k - dy_i{}^k) - Y_{i-1}[j] * ( x_{ic}{}^k - dx_i{}^k))$ --.

Signed and Sealed this

Sixteenth Day of March, 2010

David J. Kappos
*Director of the United States Patent and Trademark Office*